(12) United States Patent
Mason (10) Patent No.: US 7,543,541 B2
(45) Date of Patent: Jun. 9, 2009

(54) MEMBRANE CONNECTOR

(76) Inventor: Matthew Keith Mason, 75a Beresford Street, Bayswater, 1001 Auckland (NZ)

( * ) Notice: Subject to any disclaimer, the term of this patent is extended or adjusted under 35 U.S.C. 154(b) by 250 days.

(21) Appl. No.: 10/544,273

(22) PCT Filed: Feb. 3, 2004

(86) PCT No.: PCT/NZ2004/000022

§ 371 (c)(1),
(2), (4) Date: Apr. 24, 2006

(87) PCT Pub. No.: WO2004/069650

PCT Pub. Date: Aug. 19, 2004

(65) Prior Publication Data

US 2007/0034133 A1   Feb. 15, 2007

(30) Foreign Application Priority Data

Feb. 3, 2003   (NZ) .................................... 524005

(51) Int. Cl.
*B63H 9/04*   (2006.01)
(52) U.S. Cl. .................................................. 114/108
(58) Field of Classification Search ............. 114/102.1, 114/113, 115, 108; 24/115 K, 129 R, 129 B; 410/96–116; D8/356; 135/119; 52/3; 428/99, 428/100; 16/2.1
See application file for complete search history.

(56) References Cited

U.S. PATENT DOCUMENTS

| | | | | |
|---|---|---|---|---|
| 3,235,927 A | * | 2/1966 | Brown | ....................... 24/129 R |
| 4,204,300 A | | 5/1980 | Fildan | |
| 4,777,071 A | | 10/1988 | Liu | |
| 5,482,757 A | * | 1/1996 | Zutten et al. | ................. 428/100 |
| 5,772,371 A | * | 6/1998 | Ackerman | ................... 410/118 |
| 5,904,112 A | | 5/1999 | Tylaska et al. | |
| 6,029,594 A | | 2/2000 | Gottlieb | |

FOREIGN PATENT DOCUMENTS

| | | |
|---|---|---|
| DE | 3312847 A1 | 10/1984 |
| DE | 29605763 U1 | 7/1996 |
| GB | 2113637 A | 8/1983 |

* cited by examiner

*Primary Examiner*—Ed Swinehart
(74) *Attorney, Agent, or Firm*—Kilpatrick Stockton LLP (57) ABSTRACT

A membrane connector (1) has a generally annular body (2) having an interior region (8). An elongate projection (10) projects from the body into the interior region (8). In use, the body (2) is attached to a membrane (14) such as a yacht sail and allows a fastener such as a rope to be attached to the membrane, via the connector (1), to control or secure the membrane. The fastener typically comprises a loop of flexible material (18, 24) which may be easily placed over the projection (10) so that force can be applied to the membrane in a direction that is generally coincident with a longitudinal axis of the projection. The connector (1) allows membranes such as sails to be easily and quickly taken down and reset and has no moving parts so it is not prone to failure.

18 Claims, 6 Drawing Sheets

MEMBRANE CONNECTOR

CROSS REFERENCE TO RELATED APPLICATIONS

This application is the U.S. National Phase of PCT/NZ2004/000022 filed on 03 Feb. 2004 which claims priority to New Zealand Patent Application No. 524005 filed on 03 Feb. 2003, the contents of which are incorporated by reference herein.

FIELD OF THE INVENTION

This invention relates to a connector and a connection method for connecting a membrane to a fastener such as a rope. The invention is directed particularly, but not solely, to connecting a yacht sail to a sheet, outhaul or halyard. Other applications of the invention include securing the tack of a sail or securing awnings, tents, and architectural membranes such as marquees and shade sails.

BACKGROUND

Membranes such as yacht sails are usually provided with an eyelet or D-Ring that is used as a connector to allow the sail to be fastened in some way. One example is the clew of a headsail which will usually have an eyelet or grommet known as a clew ring. The clew ring allows the clew to be connected to a sheet in order to control or secure the sail.

Eyelets and D-Rings have the disadvantage that snap shackles or knots are usually required to establish a connection to the membrane, and these can fail. When snap shackles or similar connectors are used to connect a sail to sheets, the shackles are often taped to reduce the risk of failure. This is difficult and time consuming. Membranes such as sails and awnings are frequently required to be taken down and changed or reset, so slow or unwieldy connection methods such as knots can cause problems. Also, particularly when used to fasten a sail, snap shackles or knots can snag on shrouds or other fittings, and damage the fittings.

OBJECT

It is an object of the invention to provide a connector and/or a connection method which will at least go some way toward overcoming the foregoing disadvantages, or which will at least provide a useful alternative.

SUMMARY OF THE INVENTION

In one aspect the invention provides a membrane connector comprising a substantially annular body defining an interior space substantially bounded by the body, a projection having a proximal end and a distal end, the proximal end of the projection being provided on the body, the projection projecting into the interior space and being provided in substantially the same plane as the body, and the distal end being spaced from the body In a preferred form the distal end may include fastener retaining means to retain a fastener. The fastener retaining means may comprise an expanded portion of the projection at or adjacent to the distal end, or at least one substantially perpendicular projection from the projection at or adjacent to the distal end of the projection. In the most preferred form the distal end may comprise a substantial T-shape.

The body of the connector may preferably include membrane attachment means such as one or more apertures provided in the body.

Conveniently, the body may comprise a polygonal shape and may be an incomplete annulus.

In another aspect the invention provides a membrane connector comprising a body substantially bounding an interior space, the body including a projection having a proximal end and a distal end, the proximal end of the projection being provided on the body, the projection projecting into the interior space and being provided in substantially the same plane as the body, and the distal end being spaced from the body.

In a further aspect the invention provides a sail having a clew including a connector according to the aspects of the invention set forth above.

In another aspect the invention provides a clew ring comprising a body having a central aperture defining an interior space substantially bounded by the body, a projection having a proximal end and a distal end, the proximal end of the projection being provided on the body, the projection projecting into the interior space and being provided in substantially the same plane as the body, and, the distal end being spaced from the body.

In another aspect the invention provides a method of fastening a membrane, the method comprising the steps of:
attaching a membrane connector as set forth in any one of the preceding statements to the membrane;
providing a fastener having a hook or loop, and;
placing the hook or loop over the projection and moving the membrane or the fastener so that the hook or loop moves to the proximal end of the projection.

Preferably the step of providing a fastener may comprise providing a loop of flexible material.

Preferably the method may further include the steps of passing the loop about a further fastening member and placing the loop over the other side of the projection.

In this document, unless clearly stated to the contrary:
"membrane" herein means a substantially flexible sheet material including without limitation a sail, shade sail, tent, marquee, awning, tarpaulin, sign, or flexible sheet for architectural purposes;
"substantially annular" or "substantial annulus" means a generally annular shape including polygonal shapes and includes a generally annular shape that is an incomplete annulus;
"comprise" or variations such as "comprising" herein is to be interpreted in an inclusive sense.

DESCRIPTION OF PREFERRED EMBODIMENT

Figure 1:
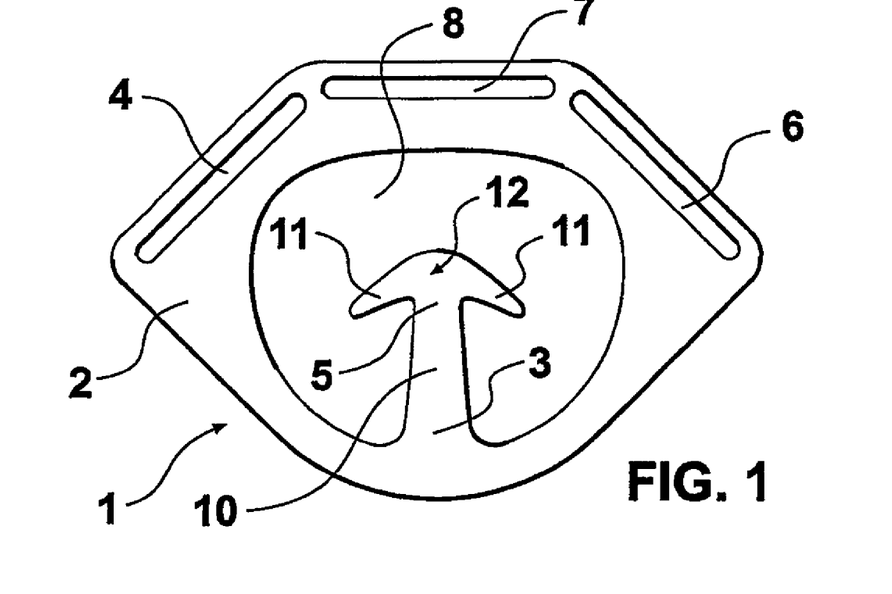
FIG. 1: is an elevation of a connector according to one embodiment of the invention.
Figure 1A:
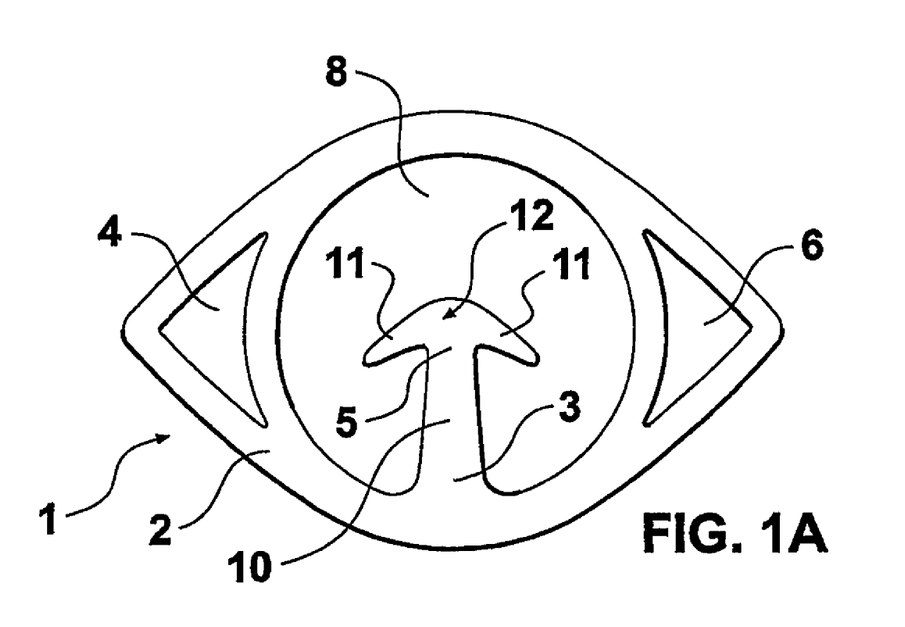
FIG. 1A: is an elevation of a connector according to another embodiment of the invention.

Referring to FIGS. 1 and 1A, two embodiments of a connector, generally referenced 1, are shown. The connector has a body 2 which in the preferred embodiment as shown in FIG. 1 has the form of a substantial annulus or ring i.e. is generally ring-like. It is not essential that the body is provided as a closed annulus or ring, but a closed body provides greater strength for the mass of material used. Those skilled in the art, will, upon reading the following description, appreciate that other body shapes or forms may be used, for example polygonal shapes such as a triangle, square or hexagon. The embodiment of FIG. 1 is most preferred.

The body 2, or walls of the body, generally define a substantially enclosed space 8. A projection 10 has a proximal end 3 which is dependent from the body, and a distal end 5 which is disposed in space 8 and is spaced from the body 2 to allow a fastener to be placed about the projection, as will be described further below. The projection 10 may take a variety of forms, for example it could be broader in the transverse direction than its length in the direction in which it projects into space 8. However in the preferred embodiment as shown in the drawings the projection is substantially elongate.

The distal end 5 of the projection has a retaining portion 12. A preferred form of the retaining portion 12 is shown in FIG. 1 in which the retaining portion has the form of a substantial T-shape. To further assist retention of a fastener about the projection, the generally perpendicularly projecting arms 11 that form the general T-shape may be curved in a direction toward proximal end 3 of the projection. The retaining portion 12 may take a variety of other forms, for example distal end 5 of the projection 10 may simply be enlarged relative to other portions of the projection. Furthermore, only one arm 11 may be provided at distal end 5 of the projection, or more than two arms by the provided spaced at varying angles about the periphery of distal end 5.

As can be seen from FIGS. 1 and 1A, the body 2 may be contoured to provide apertures 4 and 6 (and 7 in FIG. 1) which may be used to establish a connection with a membrane by disposing support loops of flexible material such as Spectra Kevlar™ through the apertures 4, 6 and 7 and attaching the ends of the loops to the membrane. Also, the body 2 in conjunction with interior space 8 also allows further support loops or straps to be looped through the body to and affixed to a membrane. This is shown and described further below with reference to FIGS. 2 and 2A. The connector is preferably disposed adjacent to the edge or corner of the membrane. If the membrane is a sail, then the connector may be attached at or adjacent to the clew of the sail to allow a sheet to be connected to the sail, via the connector. However, the connector may also be connected to a central point of a membrane to provide a desired fastening point to allow the membrane to be appropriately secured or controlled.

Figure 2:
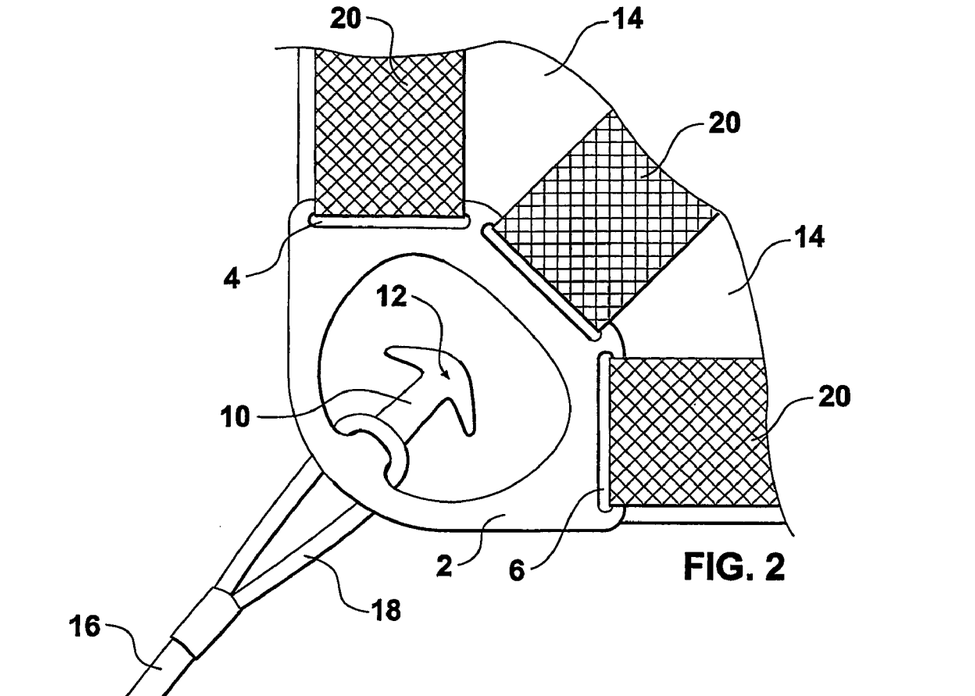
FIG. 2: is an elevation of the connector of FIG. 1 in use with a membrane and a fastening rope.
Figure 2A:
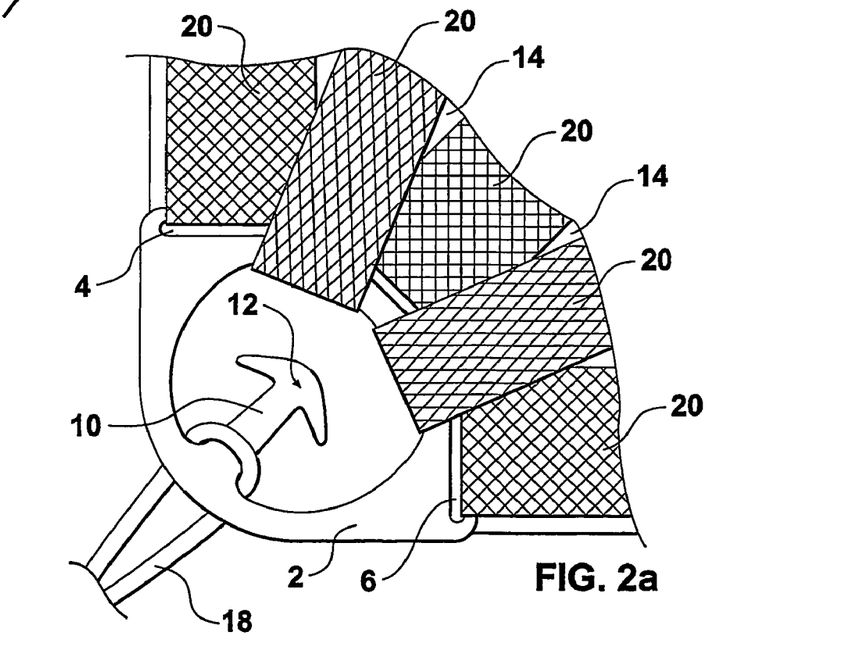
FIG. 2A: is an elevation of the connector as shown in FIG. 2 including further attachment tapes attaching the connector to the membrane.
Figure 3:
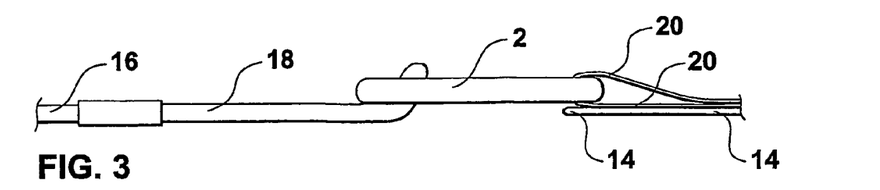
FIG. 3: is a plan view of the arrangement of FIG. 2.

Referring now to FIGS. 2, 2A and 3, the connector of FIGS. 1 and 1A is shown in use with a membrane 14. Only a portion of the membrane 14 is shown for purposes of clarity. In this example, a fastener such as a rope 16 (including a wire rope for example) has a loop such as an eye 18 provided therein which is placed over the projection 10 and pulled toward the proximal end of the projection to result in the arrangement shown in FIG. 2. The fastener may also be a loop or hook constructed from a substantially rigid material. The retaining portion 12 assists in retaining the loop 18 about the projection 10 in situations where tension may be removed from the rope or the membrane.

Lengths of flexible material may be used to fasten the connector 1 to the membrane 14. These may include ropes or lengths of sheet material for example. In the most preferred form lengths of strip material such as tapes or ribbons 20 are used. In FIG. 2 the tapes 20 are shown engaged with apertures 4, 6 and 7 of the connector by being looped through those apertures and fastened to the membrane using fastening elements for example, or by stitching or gluing or welding, or a combination of these methods. The arrangement shown in FIG. 2 may be sufficient to attach the connector to the membrane, but an attachment having greater strength can be achieved by looping further tapes through central space 8. This is shown in FIG. 2A. The ends of each tape 20 may be affixed to the same side of the membrane, or on opposite sides of the membrane by passing through apertures in the membrane for example. The connector is shown disposed on one side of the membrane in FIG. 3, but it may also be located at an edge of the membrane as shown and described below with reference to FIG. 4.

In FIG. 3, the arrangement of FIGS. 2 and 2A is shown in plan view in which it can be seen that the projection 10 is substantially in the same plane as the body of the connector and in substantially the same plane as the portions of the membrane that are adjacent to the connector. A force applied to the rope (or fastener) 16 in a direction shown by arrow 22 shows that the arrangement provides an effective connection which is very unlikely to come apart, even when load on the fastener or the membrane is removed. The arrangement also places only a small turning force on the connector. The overall assembly does not provide any significant protrusions on which other fittings are likely to snag.

Figure 4:
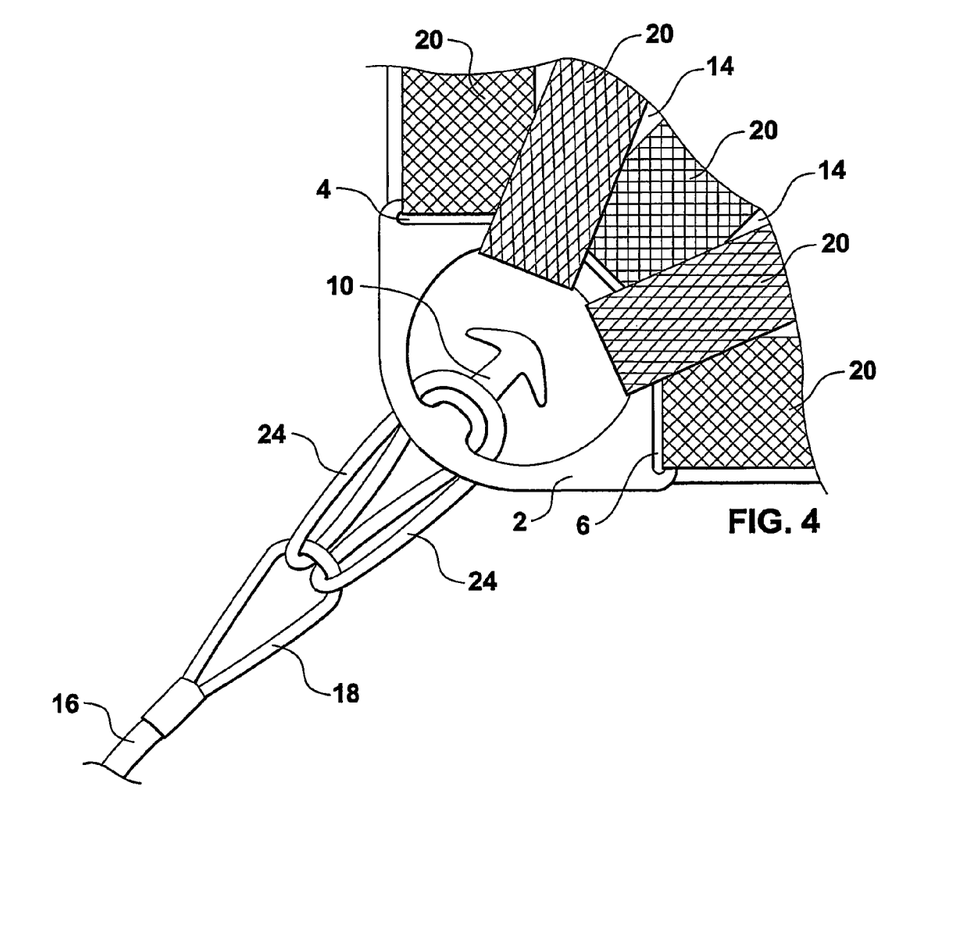
FIG. 4: is an elevation of the connector of FIG. 1 in use with a membrane such as a sail and an alternative fastening arrangement to that shown in FIG. 2.
Figure 5:
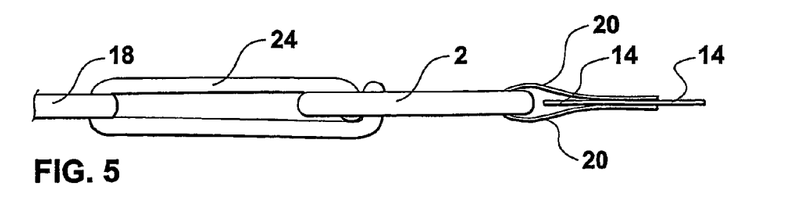
FIG. 5: is a plan view of the connection arrangement shown in FIG. 4.

Turning to FIG. 4, the most preferred arrangement of using the connector 1 to fasten a membrane is shown. A loop or strop of flexible material 24 such as wire rope or Kevlar™, for example, is placed over projection 10 from one side of the connector, passed through loop or eye 18 (or around a hook or other suitable object) then placed again over the projection from the other side of the connector. Alternatively the loop 24 is firstly placed through the eye 18 and each end of loop 24 is in turn looped over projection 10 from each side of the connector. As shown in FIG. 5, this has the advantage that the forces are evenly distributed on either side of the connector when a force is applied in the direction of arrow 22. Those skilled in the art will appreciate that the loop 24 may be provided from a variety of different materials and eye 18 may comprise a loop in a rope or a wire rope, or could be provided from a rigid material. When this arrangement is used to control a headsail there will be two eyes 18, one provided at the end of each sheet. The loops 18 may be formed in known ways, for example by eye-splicing the sheet.

Figure 6:
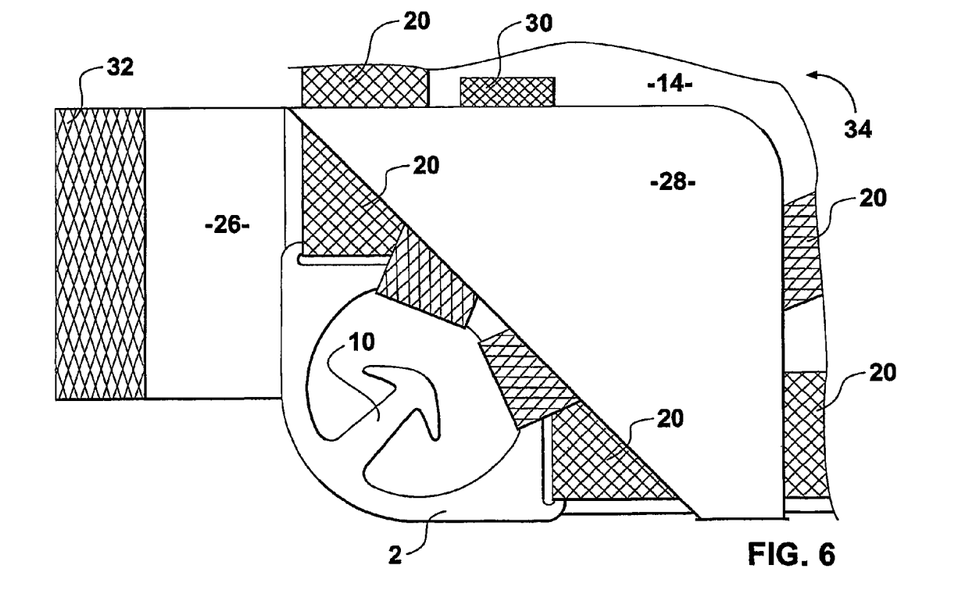
FIG. 6: is an elevation of the connector with a membrane and a cover in the open position.
Figure 6A:
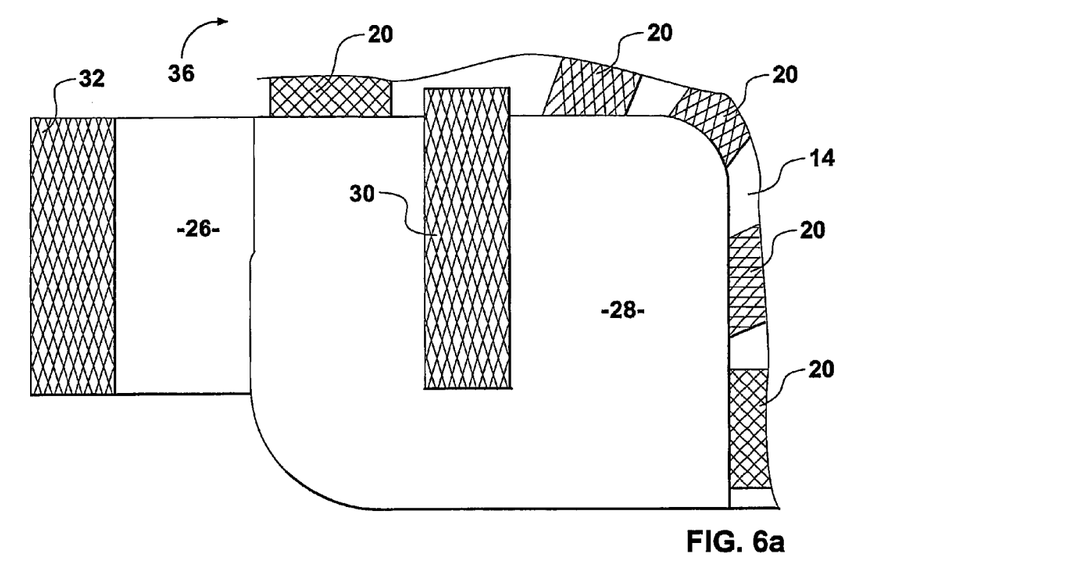
FIG. 6A: is an elevation of the arrangement of FIG. 6 with the cover in a partially closed position.
Figure 7:
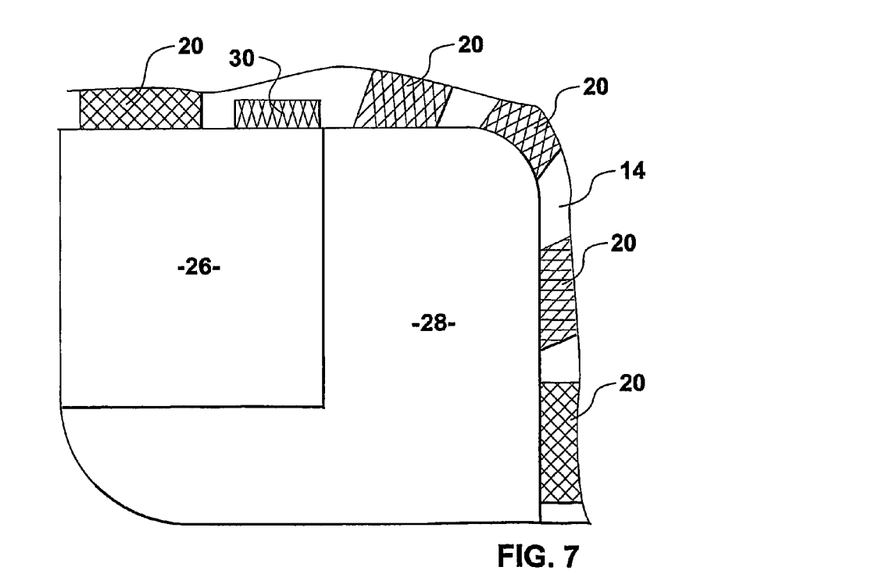
FIG. 7: is an elevation of the arrangement of FIGS. 6 and 6A with the cover in the closed position.

Turning now to FIG. 6, the connector 1 is shown attached to a membrane 14 with a cover for the connector provided on the membrane. The cover comprises two cover flaps 26 and 28 which are shown in an open, unfolded position. The external side of cover 28 has a Velcro™ strip 30 and the internal side of cover 26 has a complementary Velcro™ strip 32. To use the cover, flap 28 is firstly folded down as shown by arrow 34 to expose the Velcro™ strip 30. This is shown in FIG. 6A. Then flap 26 is folded over the exterior of flap 28 as shown by arrow 36 so that Velcro™ strips 30 and 32 engage. The resultant folded construction is shown in FIG. 7 in which it can be seen that the connector is substantially covered or enclosed by the cover flaps. In the preferred embodiment flap 26 extends over a portion of the rear side of the membrane (i.e. the side of the membrane not shown in FIG. 6) corresponding to the coverage provided by flap 28 on the front side of the membrane. Also, the cover flaps are preferably made from padded sail cloth or leather. The resultant construction is one in which the fastener (for example sheets in a sailing environment) essentially appear from the periphery of the cover so that a seamless connection to the membrane is provided. In a sailing environment this has the advantages that the fastener is constrained from being dislodged from the connector, the connector does not snag on shrouds or fittings, and unsightly damage to fittings is unlikely to occur.

When the connection to the membrane needs to be changed (for example during a sail change) the cover fastening process is reversed, so that the flaps are separated to appear as shown in FIG. 6. The loop 24 is taken off the projection 10 to release the sail, then the loop is fastened about the projection 10 of the connector attached to the new sail. The flaps are then refastened to complete the change.

The use of Velcro™ to fasten the cover is fast and effective, but other fastening elements may be used, for example zip fasteners.

Figure 8:
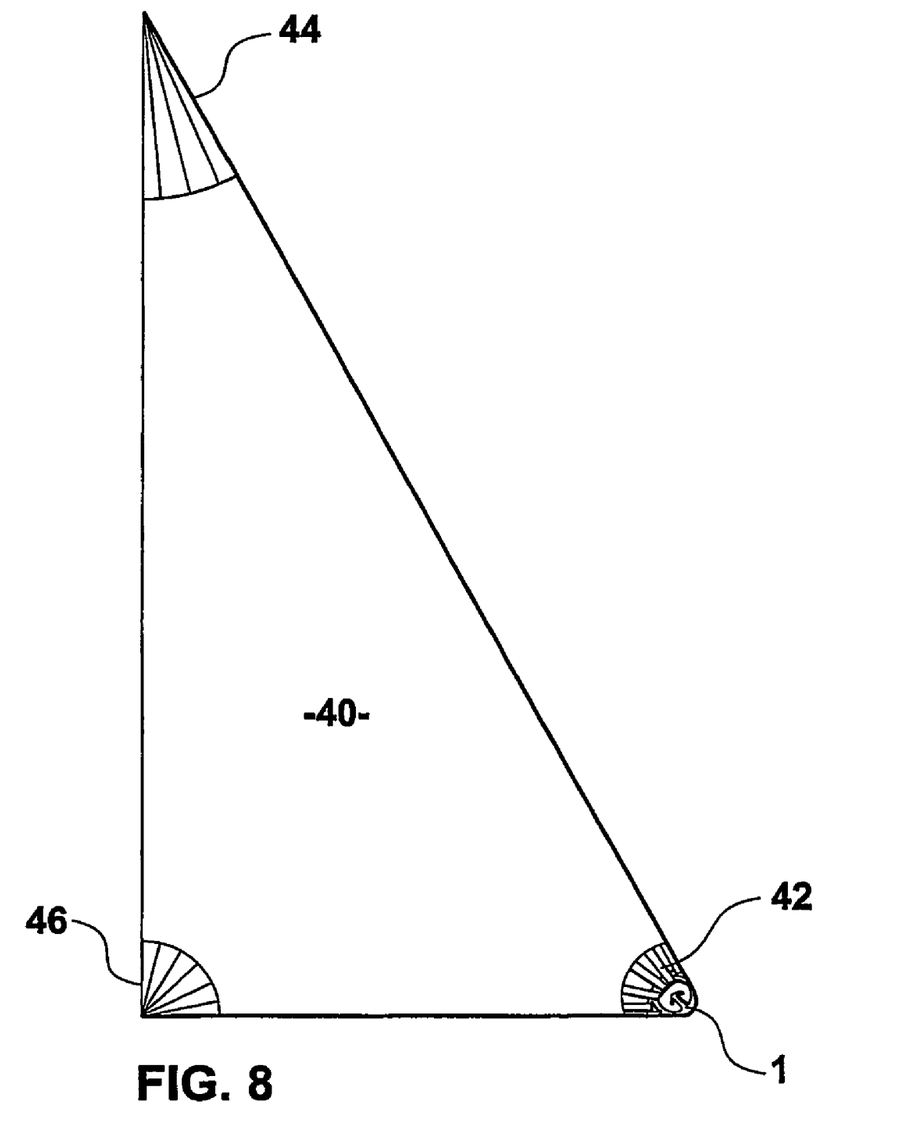
FIG. 8: is a diagrammatic elevation of a sail including a connector according to FIG. 1 provided at the clew of the sail.

In FIG. 8 the membrane 14 is shown in the form of a sail 40 having a connector 1 provided at the clew 42 of the sail. When used for this purpose the connector 1 effectively provides what is commonly referred to as a "clew ring" i.e. apparatus to allow the clew of the sail to be connected to a sheet to control the sail. Connectors 1 may also be provided at the head 44 of the sail and the tack 46 to assist connection of those parts of the sail to the appropriate spars.

Referring to FIGS. 3 and 5, it can be seen that neither the projection 10 nor the retaining portion 12 extend above the plane defined by the upper surface of the body 2 or below the plane defined by the lower surface of the body 2. As a result of this configuration, the projection 10 and retaining portion 12 are less likely to snag on adjacent fittings. As used herein, when it is stated that the projection 10 and retaining portion 12 are in substantially the same plane as the body, it will be understood to mean that neither the projection 10 nor the retaining portion 12 extend through the planes defined by the upper and lower surfaces of the body 2.

From the foregoing it will be seen that a connector is provided which has the advantages of being easy to use, relatively cheap to manufacture and unlikely to fail (no moving mechanical parts are required such as snap shackles), and unlikely to snag on adjacent fittings.

The projection 10 allows a fastener to be easily and quickly connected. A force can be applied to the membrane in a direction coincident with a longitudinal axis of the projection from the distal end of the projection to the proximal end (or in the opposite direction) with little turning moment.

Although the preferred embodiments shown in the drawings all show the fastener tensioned about the proximal end of the projection 10, the orientation of the connector can be "reversed" so that the fastener is disposed in use about the retention means 12 and arranged to exert a force in a direction from the proximal end to the distal end of the projection.

In particular, the connector has advantages when used to secure a sail on a sailing craft. When a sail is changed, the connector facilitates rapid unfastening and the new sail (including another connector according to the invention) is rapidly and easily set. It has been found that the connector 1 allows a pair of sheets to be connected to a genoa in approximately ten seconds, compared with a time of approximately sixty seconds using known methods of clipping and taping snap shackles to a known clew ring. When the connector is used in the clew of a headsail such as a genoa or gennaker, it is unlikely to snag on shrouds, and can be covered to prevent damage to fittings such as spars. The connector can be constructed from a variety of materials, for example metals (such as stainless steel or titanium), plastics or composite materials. It can be formed by a variety of known processes such as casting, moulding, forging or machining. Also, the connector can be made as a unitary item, or provided in parts which may be assembled by a user. For example, the body 2 may be made as one part by casting from steel for example and the projection 10 may be provided as a separate component which is affixed to the body by a threaded connection.

The invention claimed is:

1. A clew ring comprising a substantially annular body defining an interior space substantially bounded by the body, a projection having a proximal end and a distal end, the proximal end of the projection being provided on the body, the projection projecting into the interior space, and the distal end being spaced from the body, wherein the distal end includes fastener retaining means to assist retention of a fastener, and wherein the projection and the fastener retaining means are in substantially the same plane as the body.

2. A clew ring as claimed in claim 1, wherein the fastener retaining means comprise an expanded portion of the projection at or adjacent to the distal end.

3. A clew ring as claimed in claim 1, wherein the fastener retaining means comprise at least one substantially perpendicular projection from the projection at or adjacent to the distal end of the projection.

4. A clew ring as claimed in claim 1 wherein the distal end comprises a substantial T-shape.

5. A clew ring as claimed in claim 1 wherein the body includes membrane attachment means.

6. A clew ring as claimed in claim 5 wherein the membrane attachment means comprise one or more apertures provided in the body.

7. A clew ring comprising a body substantially bounding an interior space, the body including a projection having a proximal end and a distal end, the proximal end of the projection being provided on the body, the projection projecting into the interior space, and the distal end being spaced from the body, wherein the distal end includes fastener retaining means to assist retention of a fastener, and wherein the projection and the fastener retaining means are in substantially the same plane as the body.

8. A sail having one or more of a clew, head, or tack, said one or more of a clew, head, or tack having a clew ring connected thereto, said clew ring comprising a substantially annular body defining an interior space substantially bounded by the body, a projection having a proximal end and a distal end, the proximal end of the projection being provided on the body, the projection projecting into the interior space and the distal end being spaced from the body, wherein the distal end includes fastener retaining means to assist retention of a fastener, and wherein the projection and the fastener retaining means are in substantially the same plane as the body.

9. A sail as claimed in claim 8 wherein the connector is attached to said one or more of a clew, head, or tack by one or more lengths of flexible material.

10. A sail as claimed in claim 9 wherein the flexible material is flexible strip material.

11. A sail as claimed in claim 8 including one or more cover panels to substantially cover the connector.

12. A sailing craft comprising;
a sail having one or more of a clew, head, or tack; and
a clew ring connected to said one or more of a clew, head, or tack, said clew ring comprising a substantially annular body defining an interior space substantially bounded by the body, a projection having a proximal end and a distal end, the proximal end of the projection being provided on the body, the projection projecting into the interior space, and the distal end being spaced from the body, wherein the distal end includes fastener retaining means to assist retention of a fastener, and wherein the projection and the fastener retaining means are in substantially the same plane as the body.

13. A method of fastening a sail, the method comprising the steps of:
providing a clew ring comprising a substantially annular body defining an interior space substantially bounded by the body, a projection having a proximal end and a distal end, the proximal end of the projection being provided on the body, the projection projecting into the interior space, and the distal end being spaced from the body, wherein the distal end includes fastener retaining means to assist retention of a fastener, and wherein the projection and the fastener retaining means are in substantially the same plane as the body;
providing a fastener having a hook or loop, and
placing the hook or loop over the projection and moving the sail or the fastener so that the hook or loop is disposed at the proximal end of the projection.

14. A method as claimed in claim 13 wherein the step of providing a fastener comprises providing a loop of flexible material.

15. A method as claimed in claim 14 further including the steps of passing the loop about a further fastening member and placing each end of the loop over the projection from opposing sides of the clew ring.

16. A method as claimed in claim 15 wherein the step of passing the loop about a further fastening member comprises the step of passing the loop through an eye in a rope.

17. A method as claimed in claim 13 wherein the step of connecting the clew ring to the fastener includes the steps of looping one or more lengths of flexible material about or through parts of the connector and affixing the one or more lengths to the sail.

18. A method as claimed in claim 13 including the step of substantially covering the connector.

* * * * *